C. A. SLOCUM.
FOUR WHEEL DRIVE MECHANISM FOR TRACTORS AND THE LIKE.
APPLICATION FILED JAN. 19, 1920.

1,364,817.

Patented Jan. 4, 1921.
4 SHEETS—SHEET 1.

Conrad A. Slocum, Inventor

C. A. SLOCUM.
FOUR WHEEL DRIVE MECHANISM FOR TRACTORS AND THE LIKE.
APPLICATION FILED JAN. 19, 1920.

1,364,817.

Patented Jan. 4, 1921.
4 SHEETS—SHEET 3.

Conrad A. Slocum, Inventor

By Mason Fenwick & Lawrence,
Attorneys

C. A. SLOCUM.
FOUR WHEEL DRIVE MECHANISM FOR TRACTORS AND THE LIKE.
APPLICATION FILED JAN. 19, 1920.

1,364,817.

Patented Jan. 4, 1921.
4 SHEETS—SHEET 4.

Inventor
Conrad A. Slocum

By Mason Fenwick Lawrence
Attorneys

UNITED STATES PATENT OFFICE.

CONRAD A. SLOCUM, OF DENVER, COLORADO.

FOUR-WHEEL DRIVE MECHANISM FOR TRACTORS AND THE LIKE.

1,364,817.  Specification of Letters Patent.  Patented Jan. 4, 1921.

Application filed January 19, 1920. Serial No. 352,331.

*To all whom it may concern:*

Be it known that I, CONRAD A. SLOCUM, a citizen of the United States, residing at Denver, in the county of Denver and State of Colorado, have invented certain new and useful Improvements in Four-Wheel Drive Mechanism for Tractors and the like; and I do hereby declare the following to be a full, clear, and exact description of the invention, such as will enable others skilled in the art to which it appertains to make and use the same.

This invention relates to four wheel drives for motor driven vehicles.

An object of this invention is to provide a four wheel motor vehicle drive whereby the vehicle may be turned in a smaller area than usual and to dispense with universal joints and similar contrivances and thereby reduce the number of moving parts.

A further object of this invention is to provide in a structure of this type a balanced drive.

A further object of this invention is to reduce the cost of construction and increase the efficiency and generally to simplify the construction of four wheel driven motor vehicles.

With these and other objects in view the invention consists in the construction, the combination, the detail, and arrangement of parts as hereinafter more fully described and claimed.

Figure 1:
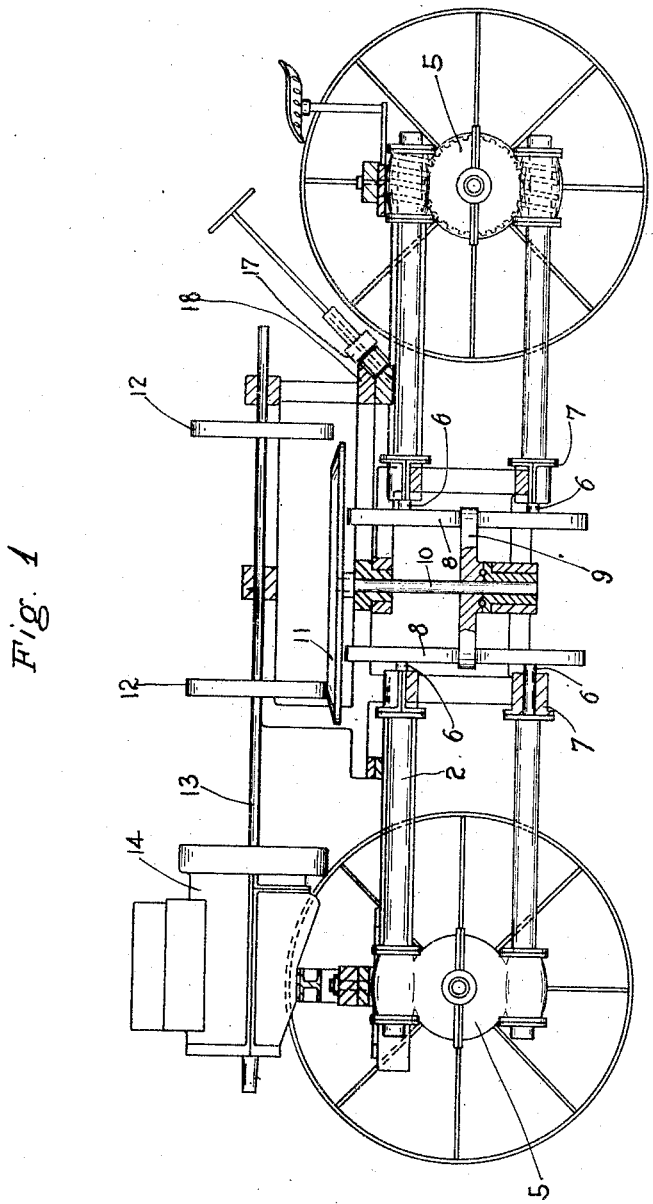
Figure 1 is a side elevation of my improved type of motor vehicle with parts left out for clearness in illustration, as indicated by the line 1—1 in Fig. 2 and shown partly in section.
Figure 2:
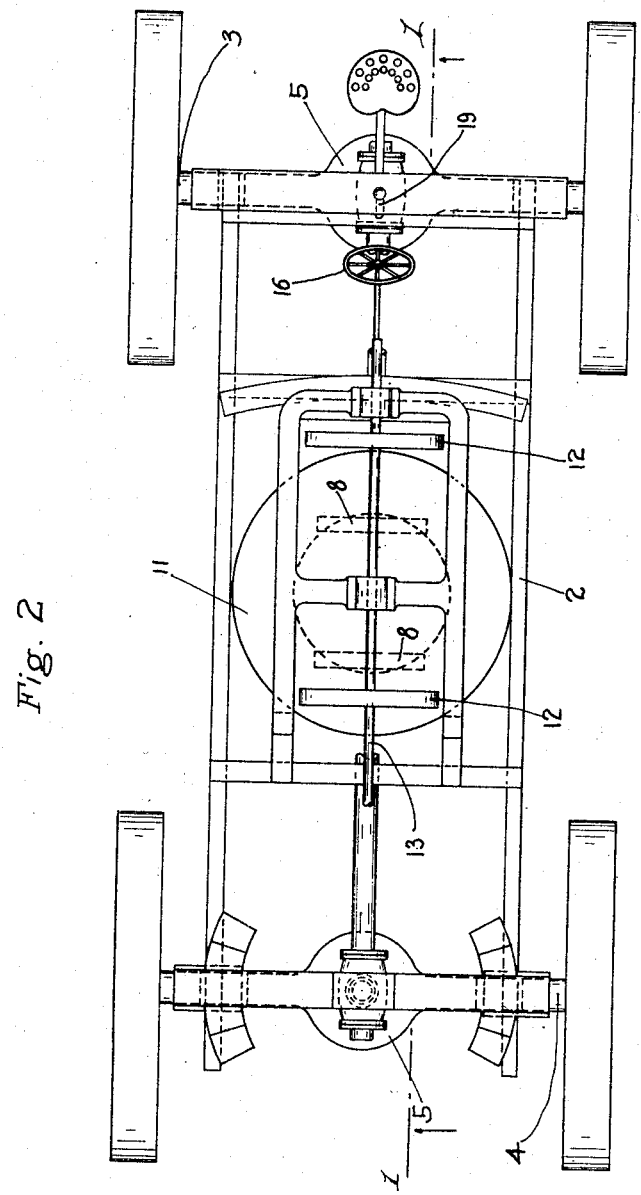
Fig. 2 is a top plan view of the machine with the wheels parallel with the center line.

In the embodiment of my invention I provide a frame 2, to the under side of which is mounted so that they can swivel, axles and wheels 3 and 4. Connected to these axles also and mounted thereon is a worm gear with a worm top and bottom indicated by dotted lines in Fig. 1 as inclosed in a case 5, the worm shafts 6 being extended through the bearings 7 and having mounted on their outside ends friction disks 8. Engaging with these disks is a horizontal disk 9 mounted on shaft 10 and supported by top and bottom bearings as shown in Fig. 1, at the upper end of which is mounted a friction disk 11. Friction disks 12 engage successively with disk 11 dependent upon which direction it is required to rotate disk 11, these being all slidably mounted on shaft 13, which is the extended main shaft of the motor 14. Disks 12 may be provided with any suitable form of lever system for moving them longitudinally along the shaft 13. Any suitable lever system may be used.

Figure 3:
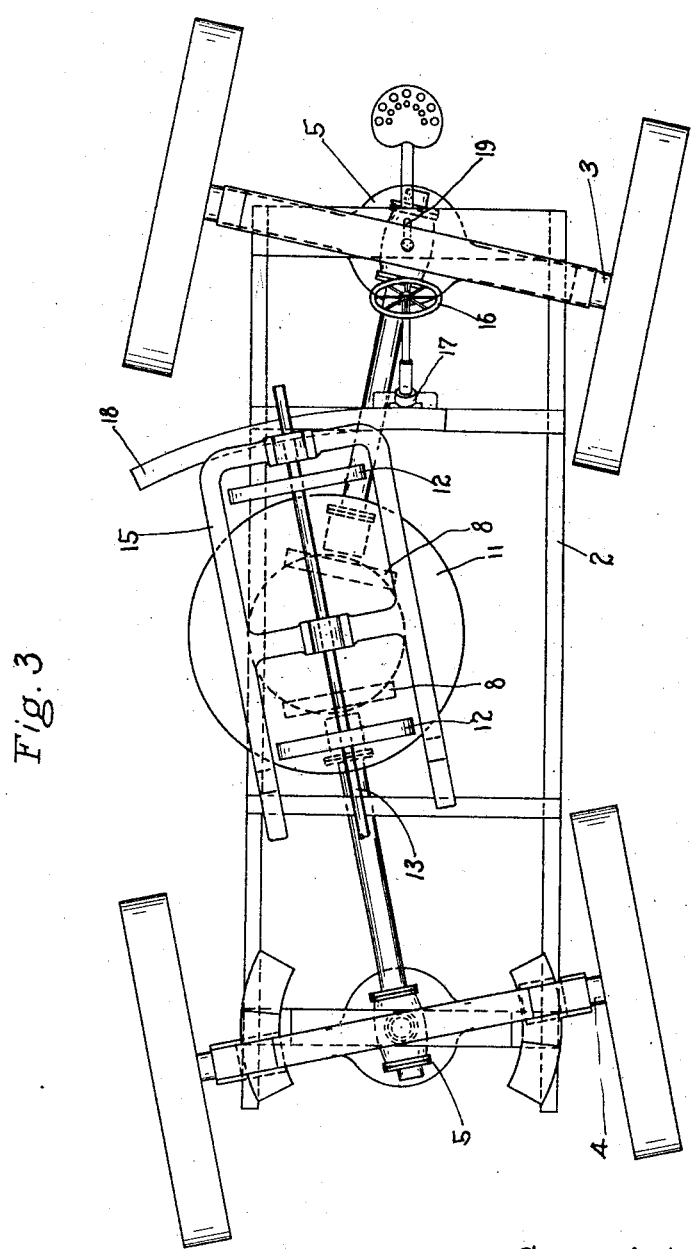
Fig. 3 is a top plan showing the transmission mechanism swung over to its limiting position on one side and the wheels and axles in corresponding position.
Figure 5:
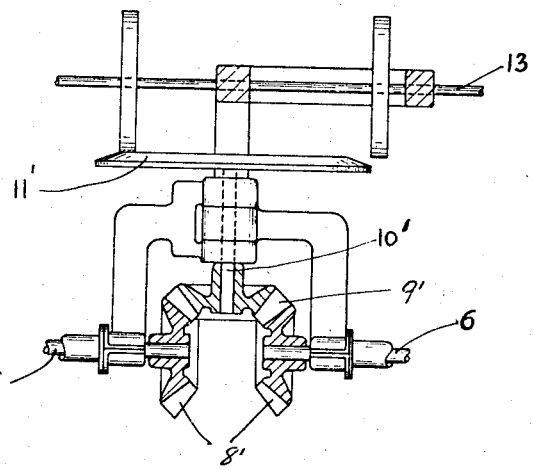
Fig. 5 is an alternative design of the transmission.
Figure 4:
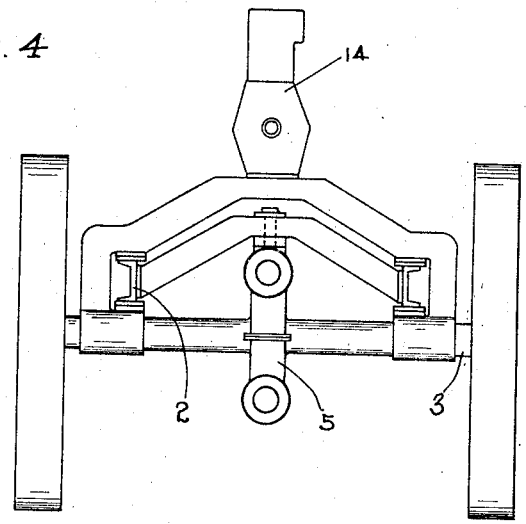
Fig. 4 is an end view looking from the front of the machine.

The entire transmission system covering the various disks and shafting is securely built into the frame 15, provision being made also for swinging the shafting 6 into proper relative position, as shown in Fig. 3. Frame 15 is suitably guided to secure against vertical motion and movement is effected by means of a hand wheel 16, transmitting through the pinion 17 to segment 18. Any suitable or approved type of steering mechanism may be substituted for that shown. In Fig. 3 also a slotted hole 19 compensates for the side movement of the mechanism included with frame 15 by allowing a slight longitudinal motion on frame 2. Fig. 5 shows an alternative design of a portion of the transmission 6, being the extended worm shaft on which are mounted bevel gears 8' meshing with a common gear 9'. This gear is mounted on a vertical shaft 10' corresponding to shaft 10, and on the upper end a disk 11' corresponding to disk 11 while the engine shaft 13 carries the two primary and reversing disks as described above. It will be noted that in this design preferably only one worm is used, this being the practical application of a tooth gear to this device. In the case of the friction drive there is provided compensation or differential action in the slippage, which makes it practical to use the double drive.

In operation, by the turning of hand wheel 16, transmitting a rotary motion to pinion 17, which is fixedly mounted thereto and which comeshes with a rack in segment 18, an angular movement to frame 15 upon the pivotal axis of the front axle is caused relative to the chassis 2 causing likewise a relative angular movement of the motor and the entire transmission for the front axle, and providing a flex substantially central of the vehicle relative to the front and rear axle, at the same time causing an angular movement of the rear axle and sliding the rear axle in the slot 19 to compensate for the changed distance caused by this angularity, the result being that the entire transmission is moved substantially transverse to the vehicle and causes the transmission to both the front and rear axle to substantially pivot upon the center of disk 9.

Claims:

1. In a motor vehicle, a front and rear axle each provided with an upper and lower transmission thereto, said transmissions radiating from and driven by a central disk the said front and rear transmissions being relatively flexed.

2. In a motor vehicle, a front and rear axle each provided with an upper and lower transmission thereto, said transmissions radiating from and driven by a central shaft, the said front and rear transmissions being relatively flexed, said shaft being also provided with a disk for driving the same.

3. In a motor vehicle, a front and rear axle each provided with a transmission from above and below, a vertical shaft substantially central said vehicle and provided with a pair of disks, one of said disks driving all of said transmissions, a motor provided with a shaft extending longitudinal of said vehicle and having mounted thereon a plurality of friction disks to engage the other of said disks on said vertical shaft.

4. In a motor vehicle, a front and rear axle each provided with a transmission from above and below, a vertical shaft substantially central said vehicle and provided with a pair of disks, one of said disks driving all of said transmissions, a motor provided with a shaft extending longitudinal of said vehicle and having mounted thereon a plurality of friction disks to engage the other of said disks on said vertical shaft, the transmissions to each of said axles being relatively flexed.

5. In a motor vehicle, a front and rear axle each provided with a transmission from above and below, a vertical shaft substantially central said vehicle and provided with a pair of disks, one of said disks driving all of said transmissions, a motor provided with a shaft extending longitudinal of said vehicle and having mounted thereon a plurality of friction disks to engage the other of said disks on said vertical shaft, the transmissions to each of said axles being relatively flexed, and the said shaft and said motor movable with one of said transmissions.

6. In a motor vehicle, a front and rear axle each provided with a transmission from above and below, a vertical shaft substantially central said vehicle and provided with a pair of disks, one of said disks driving all of said transmissions, a motor provided with a shaft extending longitudinal of said vehicle and having mounted thereon a plurality of friction disks to engage the other of said disks on said vertical shaft, the transmissions to each of said axles being relatively flexed, the said shaft and said motor movable with one of said transmissions and the other of said transmissions longitudinally movable during said flexing.

In testimony whereof I affix my signature.

CONRAD A. SLOCUM.